Patented Feb. 11, 1947

2,415,544

UNITED STATES PATENT OFFICE 2,415,544

PROCESS OF PURIFYING CO-CARBOXYLASE

John Weijlard, Rahway, N. J., assignor to Merck & Co., Inc., Rahway, N. J., a corporation of New Jersey No Drawing. Application April 4, 1941,
Serial No. 386,943

2 Claims. (Cl. 260—251)

This invention relates to a process of purifying impure synthetic co-carboxylase.

Co-carboxylase may be obtained from natural sources, but it is prepared most economically and easily from vitamin $B_1$ by synthetic methods by reaction with a phosphoric acid. The reaction mixture contains, in addition to co-carboxylase, large amounts of non-reacted vitamin $B_1$, the ortho phosphate ester of vitamin $B_1$, and large amounts of phosphate. In the heretofore methods of purification, the phosphates were first removed by means of barium. Then the crude co-carboxylase was precipitated from the resulting product with silver through careful control of the pH, the silver salt thus obtained was decomposed, and the resulting product subjected to further concentration by means of phosphotungstic acid, following which the co-carboxylase was fractionally crystallized from solvents, such as aqueous acetone or alcohol. This procedure is laborious and expensive. The step of barium precipitation is especially objectionable because the precipitate obtained is voluminous and difficult to wash thoroughly in order to remove all co-carboxylase.

I have discovered that the precipitation with phosphotungstic acid can be applied directly to the crude reaction mixture. In this way, the step of precipitating with silver is avoided entirely, and the removal of phosphate with barium is deferred until a later stage, in which the amount of phosphate left is small, and its removal with barium presents no special difficulty. According to my improved process, the crude reaction mixture is precipitated by phosphotungstic acid, the precipitate decomposed by means of acetone, the sticky mass resulting is fractionally precipitated from aqueous acetone, then treated with a barium ion to remove phosphates, the resulting products fractionally precipitated from aqueous acetone, and finally crystallized from acidified aqueous alcohol.

The following example illustrates a method of carrying out the present invention, but it is to be understood that this example is given by way of illustration and not of limitation.

Example 100 cc. of 85% phosphoric acid, reagent grade, is heated in a 400 cc. Pyrex beaker over a free flame until fumes appear and a slight crystalline deposit is noted. After the addition of 24 gms. of anhydrous sodium pyrophosphate, the mixture is stirred until all is in solution. The hot acid is cooled to 135° C., the beaker is placed in an oil bath, preheated to 155° C., and 40 gms. vitamin $B_1$ are added and mixed well. It is kept for 10 minutes in an oil bath at 155° C. with continuous stirring, then cooled to room temperature and dissolved in 2 l. water. 1280 cc. 2.5 normal hydrochloric acid are added, and volume made up to 4 l. with water.

Crude co-carboxylase phosphotungstate is precipitated by adding 750 cc. of 25% phosphotungstic acid with stirring. The mixture is centrifuged and the supernatant liquid is discarded.

The crude phosphotungstate is dissolved in 16 l. pure acetone. As the solid disintegrates, a sticky substance (crude co-carboxylase) separates. It is kept at 0–2° C. overnight, and the supernatant liquid is decanted and discarded. The sticky residue is dissolved in 600 cc. of tenth normal hydrochloric acid, the acid solution is centrifuged and the clear liquid is decanted. The residue is agitated with 200 cc. of tenth normal hydrochloric acid and then centrifuged. Ten volumes of acetone (8 liters) is added to the combined acid solutions, and the mixture chilled overnight at 0–2° C. The supernatant liquid is discarded and the residue (a soft glassy mass) is dissolved in 200 cc. water. The aqueous solution is cooled in ice, and precipitated with 860 cc. concentrated barium hydroxide solution. The precipitated barium phosphate is centrifuged off at 5° C., the clear supernatant liquid is decanted, acidified with hydrochloric acid to Congo red, and cooled immediately in ice. The precipitate is agitated with 200 cc. water, centrifuged, and the washings added to the main solution.

To the cooled solution, 10% sulfuric acid is added to precipitate the excess of barium, adjusting it so that not more than a slight trace of sulfuric acid is added in excess. The barium sulfate is separated by centrifuging, and washed once in the centrifuge with 30 cc. water. The united solutions and washings, measuring 1260 cc., are mixed with 12.6 liters of acetone and kept at 0–2° C. overnight.

The supernatant liquid is discarded. The residue, a glassy mass, is dissolved in 150 cc. tenth normal hydrochloric acid, 800 cc. absolute alcohol are added, and the mixture allowed to stand at about 0° C. for 4 days.

The supernatant liquid is discarded, the solid precipitate which forms is washed first with absolute alcohol, and then with ether. The still soft mass (10.4 gms.) is dissolved in 70 cc. tenth normal hydrochlaric acid, treated with 0.5 gm. carboraffin, and filtered after 10 minutes at room temperature. The solution is made up with tenth normal hydrochloric acid to a volume of 200 cc. 600 cc. absolute alcohol are added, and the mixture cooled in the ice box for 3 hours. 1400 cc. acetone are added, and the mixture refrigerated at 6–7° C. for 48 hours with frequent scratching. The slightly turbid solution is decanted, the crystals are collected on a filter, and washed with alcohol, then with ether; yield 6.3 gms. main crop of semi-crude co-carboxylase.

The main semi-crude product is dissolved in 120 cc. tenth normal hydrochloric acid, and 350 cc. absolute alcohol is added. After a few hours cooling, 10 cc. more alcohol are added, and the mixture allowed to crystallize in the refrigerator for 4 days with occasional scratching. The crystals are collected and washed with absolute alcohol, then with ether, and dried in vacuo over sulfuric acid a few hours; yield 3.96 gms., M. P. 238–240° C.

The mother liquors and alcoholic washings from the semi-crude as well as from the pure co-carboxylase are allowed to stand a week in the ice box, and an additional small crop of semi-crude material are obtained. These are recrystallized as above. Yield 0.87 gm., M. P. 230–233° C.

Modifications may be made in carrying out the present invention, without departing from the spirit and scope thereof, and I am to be limited only by the appended claims.

I claim:

1. In the process of purifying impure co-carboxylase obtained by the phosphorylation of vitamin $B_1$ and containing large amounts of unreacted vitamin $B_1$, the step which comprises treating an aqueous solution of said co-carboxylase containing said vitamin in large amounts with phosphotungstic acid, prior to the separation of vitamin $B_1$ therefrom.

2. In the process of purifying impure co-carboxylase obtained by the phosphorylation of vitamin $B_1$ and containing large amounts of unreacted vitamin $B_1$, the steps which comprise treating an aqueous solution of said co-carboxylase containing said vitamin in large amounts with phosphotungstic acid, prior to the separation of vitamin $B_1$ therefrom, and treating the precipitate formed with acetone.

JOHN WEIJLARD.

REFERENCES CITED

The following references are of record in the file of this patent:

"J. Amer. Chem. Soc." vol. 60 pages 2263–4.

Biochemical Journal vol. 34 pages 983, 986–988—1940.

"Biochem. Zeit" vol. 294 pages 192–3.